US006826319B2

(12) United States Patent
Lee

(10) Patent No.: US 6,826,319 B2
(45) Date of Patent: Nov. 30, 2004

(54) OPTICAL ISOLATOR

(75) Inventor: Chun Yu Lee, Tu-Chen (TW)

(73) Assignee: Hon Hai Precision Ind. Co., LTD, Taipei Hsien (TW)

( * ) Notice: Subject to any disclaimer, the term of this patent is extended or adjusted under 35 U.S.C. 154(b) by 234 days.

(21) Appl. No.: 10/138,743

(22) Filed: May 3, 2002

(65) Prior Publication Data

US 2003/0108266 A1 Jun. 12, 2003

(30) Foreign Application Priority Data

Dec. 12, 2001 (TW) ........................... 90221694 U

(51) Int. Cl.[7] ............................ G02B 6/00; G02B 27/28
(52) U.S. Cl. .............................................. 385/11; 359/484
(58) Field of Search ................................. 385/11, 33, 34, 385/60, 72, 73, 6, 57, 58, 59, 66, 71, 74; 398/85, 88; 359/484, 494, 495, 497

(56) References Cited

U.S. PATENT DOCUMENTS

| | | | | | |
|---|---|---|---|---|---|
| 4,375,910 A | * | 3/1983 | Seki | ........................... | 359/484 |
| 5,208,876 A | * | 5/1993 | Pan | ........................... | 385/11 |
| 5,317,655 A | * | 5/1994 | Pan | ........................... | 385/11 |
| 5,446,813 A | * | 8/1995 | Lee et al. | ........................... | 385/31 |
| 5,594,821 A | * | 1/1997 | Cheng | ........................... | 385/24 |
| 5,642,447 A | * | 6/1997 | Pan et al. | ........................... | 385/31 |
| 5,661,829 A | * | 8/1997 | Zheng | ........................... | 385/33 |
| 5,689,359 A | * | 11/1997 | Kurata et al. | ........................... | 359/281 |
| 5,734,762 A | * | 3/1998 | Ho et al. | ........................... | 385/11 |
| 5,930,038 A | * | 7/1999 | Swan | ........................... | 359/484 |
| 6,048,103 A | * | 4/2000 | Furukata et al. | ........................... | 385/73 |
| 6,088,153 A | * | 7/2000 | Anthon et al. | ........................... | 359/341.32 |
| 6,556,733 B2 | * | 4/2003 | Dy et al. | ........................... | 385/11 |

* cited by examiner

*Primary Examiner*—Joseph Williams
*Assistant Examiner*—Peter Macchiarolo
(74) *Attorney, Agent, or Firm*—Wei Te Chung

(57) ABSTRACT

An optical isolator (10) includes a first optical collimator (20), an optical isolating unit (30), a second optical collimator (40), and a tubular housing (50). The first optical collimator includes an input optical fiber and a first collimating lens (23). The second optical collimator includes an output optical fiber and a second collimating lens (43). The optical isolating unit includes an optical rotator (32), first and second birefringent wedges (31, 33), a pair of beam displacers (34), and a magnetic tube (35). The beam displacers are fixed to respective opposite ends of the optical rotator. The first and second birefringent wedges are respectively fixed to the first and second collimating lenses. The magnetic tube encloses protruding portions of the first and second collimating lenses, the first and second birefringent wedges, the beam displacers and the optical rotator therein. Each beam displacer effectively eliminates any undesired displacement of a light beam.

11 Claims, 5 Drawing Sheets

OPTICAL ISOLATOR

BACKGROUND OF THE INVENTION

1. Field of the Invention

The present invention relates to optical isolators, and particularly to an optical isolator provided with a beam displacer that eliminates any undesired displacement of a light beam propagating through the isolator.

2. Description of Prior Art

Optical isolators are key elements in fiber optic communications systems in which optical signals are generated by lasers. However, if a laser used in a transmitter is subject to undesired optical reflection, this can result in optical wavelength jitter, laser output intensity noise, and uncontrolled optical power modulations. Accordingly, an optical isolator is used in a fiber optic communication system to block reverse transmission of optical signals to a laser transmitter while providing low attenuation of forward transmission.

Referring to FIG. 1, a conventional optical isolator 100 disclosed in U.S. Pat. No. 5,446,813 comprises first and second collimators 110, 120, and an isolating unit 130 disposed between the first and second collimators 110, 120. The isolating unit 130 comprises first and second birefringent wedges 131, 132, an optical rotator 133, and a magnetic tube 134 retaining the optical rotator 133 therein. The first and second birefringent wedges 131, 132 are fixed to opposite ends of the optical rotator 133 with adhesive. The first and second collimators 110, 120 are disposed at opposite sides of the isolating unit 130.

According to Snell's law, when a light beam travels through a different medium, a displacement will generally occur in its direction of propagation. Referring to FIG. 2, when a light beam travels through the isolating unit 130, a slight displacement occurs. The displacement is designated as D, and occurs because of a difference between refractive indices of air and the isolating unit 130. In practice, the displacement D must be adjusted manually by using a microscope, so that light beams can be directed from the isolating unit 130 to the second collimator 120. If the displacement D is not eliminated, two polarized light beams 120A, 120B cannot be efficiently coupled concurrently into the second collimator 120. The result is increased insertion loss. Furthermore, the first and second birefringent wedges 131, 132 are fixed to opposite ends of the optical rotator 133 with adhesive. It is therefore impossible to further adjust the predetermined angle between transmission axes of the first and second birefringent wedges 131, 132.

SUMMARY OF THE INVENTION

In view of the above, an object of the present invention is to provide a method for manufacturing an optical isolator which can obviates the need for using a microscope to collimate light beams exiting from an isolating unit to a second optical collimator.

Another object of the present invention is to provide an optical isolator having two birefringent wedges respectively fixed to corresponding collimating lenses to ensure correct orientation of transmission axes of the birefringent wedges.

In order to achieve the objects set out above, an optical isolator in accordance with the present invention comprises a first optical collimator, an optical isolating unit, a second optical collimator and a tubular housing. The first optical collimator comprises an input optical fiber and a first collimating lens. The second optical collimator comprises an output optical fiber and a second collimating lens. The optical isolating unit comprises an optical rotator, first and second birefringent wedges, a pair of beam displacers, and a magnetic tube. Each beam displacer creates an offset of a light beam that effectively eliminates any displacement of the light beam that might otherwise occur. The beam displacers are fixed to respective opposite ends of the optical rotator. The first and second birefringent wedges are respectively fixed to inmost end surfaces of the first and second collimating lenses by conventional means. The magnetic tube encloses protruding portions of the first and second collimating lenses, the first and second birefringent wedges, the beam displacers and the optical rotator therein.

In assembly, relative orientations of the first and second optical collimators are adjusted such that optimized insertion loss and isolation are achieved.

Other objects, advantages and novel features of the invention will become more apparent from the following detailed description when taken in conjunction with the accompanying drawings, in which:

DETAILED DESCRIPTION OF PREFERRED EMBODIMENT

Reference will now be made to the drawings to describe the present invention.

Figure 1:
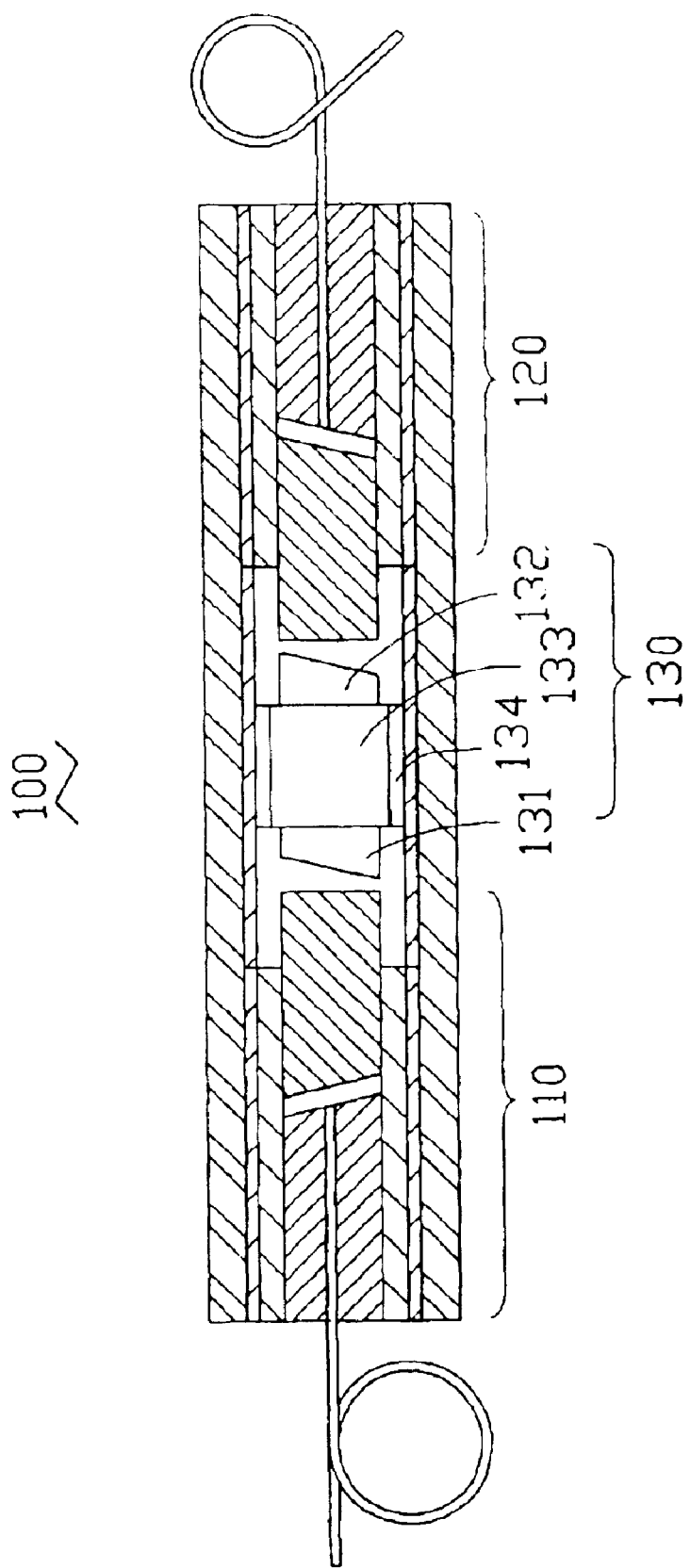
FIG. 1 is a cross-sectional view of a conventional optical isolator.
Figure 2:
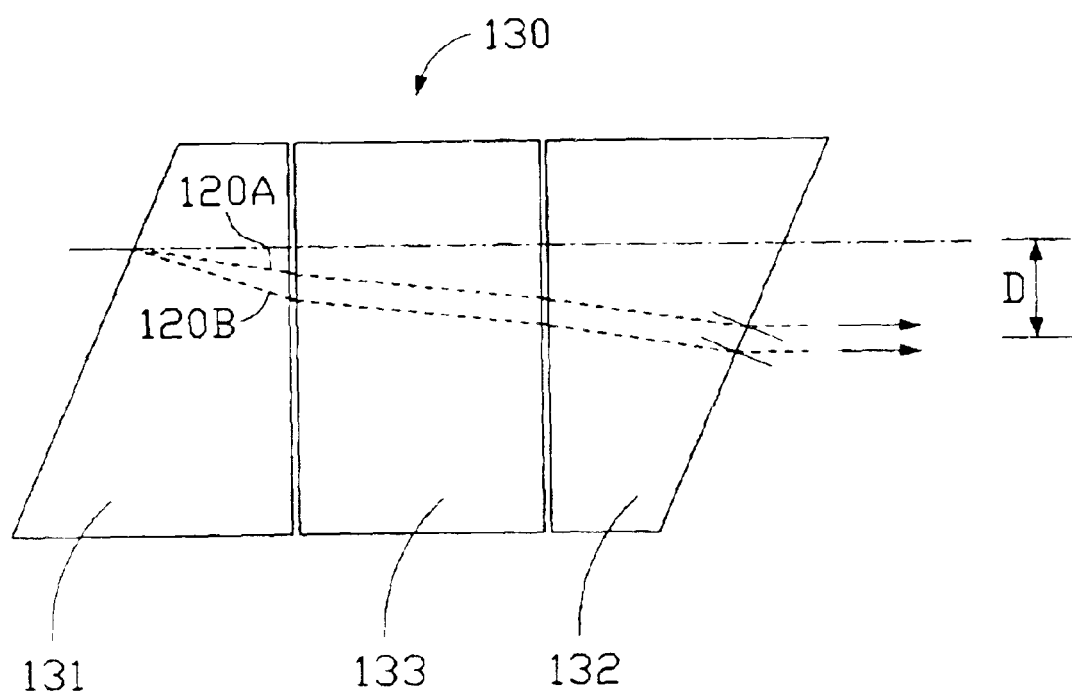
FIG. 2 is schematic view of a light beam passing in a forward direction through an isolating unit of the optical isolator of FIG. 1.
Figure 3:
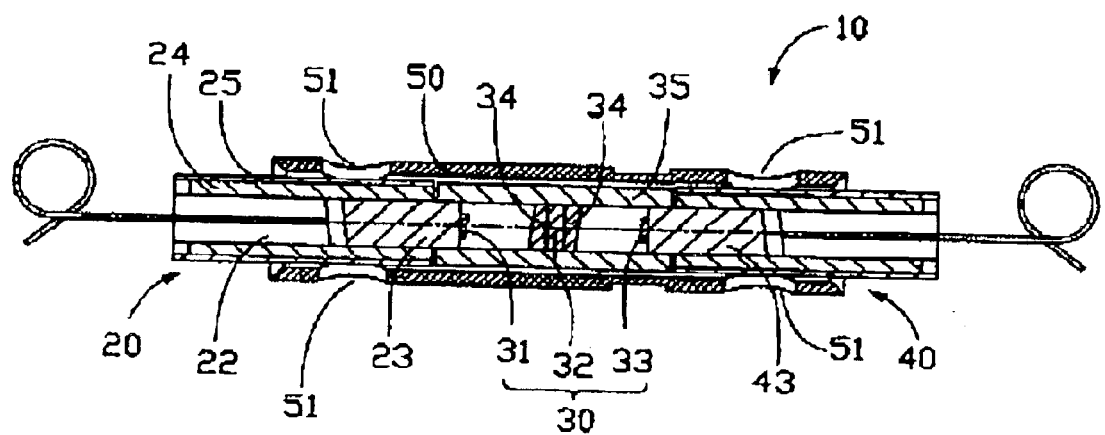
FIG. 3 is cross-sectional view of an optical isolator in accordance with a preferred embodiment of the present invention.

Referring to FIG 3, an optical isolator 10 in accordance with a preferred embodiment of the present invention comprises a first optical collimator 20, an optical isolating unit 30, a second optical collimator 40 and a tubular housing 50. The first optical collimator 20 comprises an input optical fiber (not labeled), a ferrule 22 retaining the input optical fiber therein, a first collimating lens 23, a sleeve 24, and a metallic tube 25. The sleeve 24 is generally made of glass or another suitable material. The sleeve 24 retains the ferrule 22 and the first collimating lens 23 therein. The sleeve 24 is in turn retained in the metallic tube 25. A portion of the first collimating lens 23 protrudes beyond an inner end of the sleeve 24. The second optical collimator 40 has a configuration substantially the same as that of the first optical collimator 20. The second optical collimator 40 comprises an output optical fiber (not labeled), and a second collimating lens 43. The first optical collimator 20, the optical isolating unit 30, and the second optical collimator 40 are arranged sequentially in a coaxial relationship to each other in the tubular housing 50. A pair of opposite soldering holes 51 is defined near each of opposite ends of the tubular housing 50, for securing the first and second optical collimators 20, 40 to the tubular housing 50.

The optical isolating unit 30 comprises an optical rotator 32, first and second birefringent wedges 31, 33, a pair of beam displacers 34, and a magnetic tube 35. The first and second birefringent wedges 31, 33 divide an incident light beam (not labeled) into two polarized elements 12A, 12B (see FIG. 4). Outmost end surfaces of the first and second birefringent wedges 31, 33 are respectively fixed to inmost end surfaces of the first and second collimating lenses 23, 43 by conventional means. Each beam displacer 34 is generally made of crystal, and is generally wedge-shaped. The wedge shaping creates an offset of a light beam that effectively eliminates any displacement of the light beam that might otherwise occur. The beam displacers 34 are fixed to respective opposite ends of the optical rotator 32 with adhesive. The optical rotator 32 can rotate the polarized elements 12A, 12B at an angle of 45 degrees in a predetermined direction. The magnetic tube 35 encloses the protruding portions of the first and second collimating lenses 23, 43, the first and second birefringent wedges 31, 33, the optical rotator 35, and the beam displacers 34 therein.

In assembly, relative orientations of the first and second optical collimators 20, 40 are adjusted such that optimized insertion loss and isolation is achieved. The first and second optical collimators 20, 40 and the optical isolating unit 30 are inserted into and fixed within the tubular housing 50. The first and second optical collimators 20, 40 are then soldered to the tubular housing 50 via the soldering holes 51.

Figure 4:
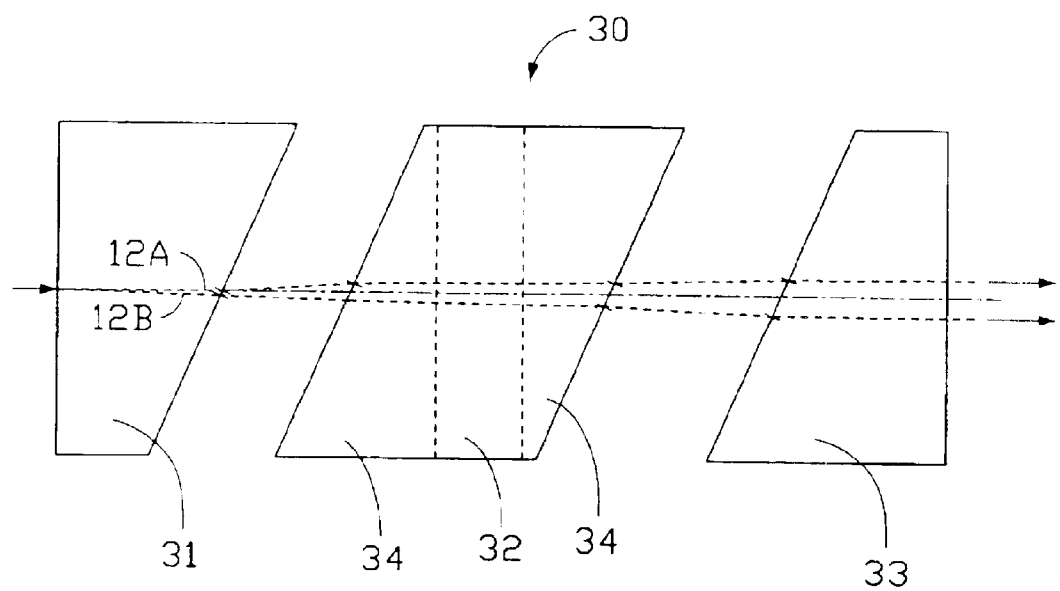
FIG. 4 is a schematic view of a light beam passing in a forward direction through an isolating unit of the optical isolator of FIG. 3.

An operating principle of isolation of a light beam propagating in the optical isolator 10 is as follows. FIG. 4 shows a light beam propagating in a forward direction in the optical isolator 10. The incident beam is divided into the orthogonal polarized elements 12A, 12B by the first birefringent wedge 31. The polarized elements 12A, 12B travel through the optical rotator 32 and the beam displacers 34, and are then redirected into parallel beams by the second birefringent wedge 33. The parallel beams are coupled into the output optical fiber by the second collimating lens 43 of the second optical collimator 40.

Figure 5:
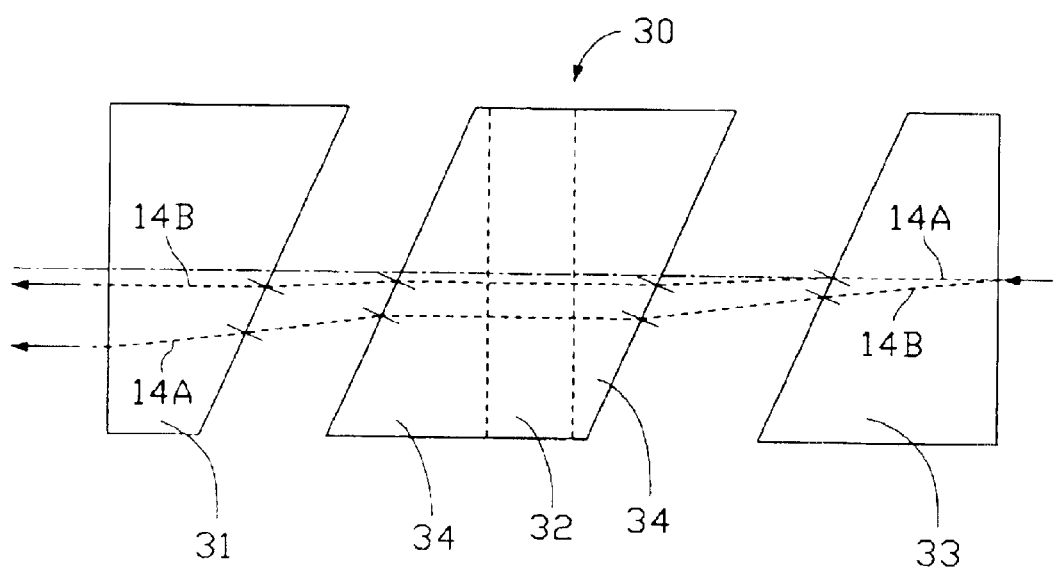
FIG. 5 is a schematic view of a light beam passing in a reverse direction through the isolating unit of FIG. 4.

FIG. 5 shows a light beam propagating in a reverse direction in the optical isolator 10. The light beam is divided into two orthogonal polarized elements 14B, 14A by the second birefringent wedge 33. After being rotated at a predetermined angle by the optical rotator 33, the two polarized elements 14B, 14A are deflected after passing through the first birefringent wedge 31. Therefore, after exiting the first birefringent wedge 31, the polarized elements 14B, 14A cannot be directly coupled into the first collimating lens 23 of the optical collimator 20.

Figure 6:
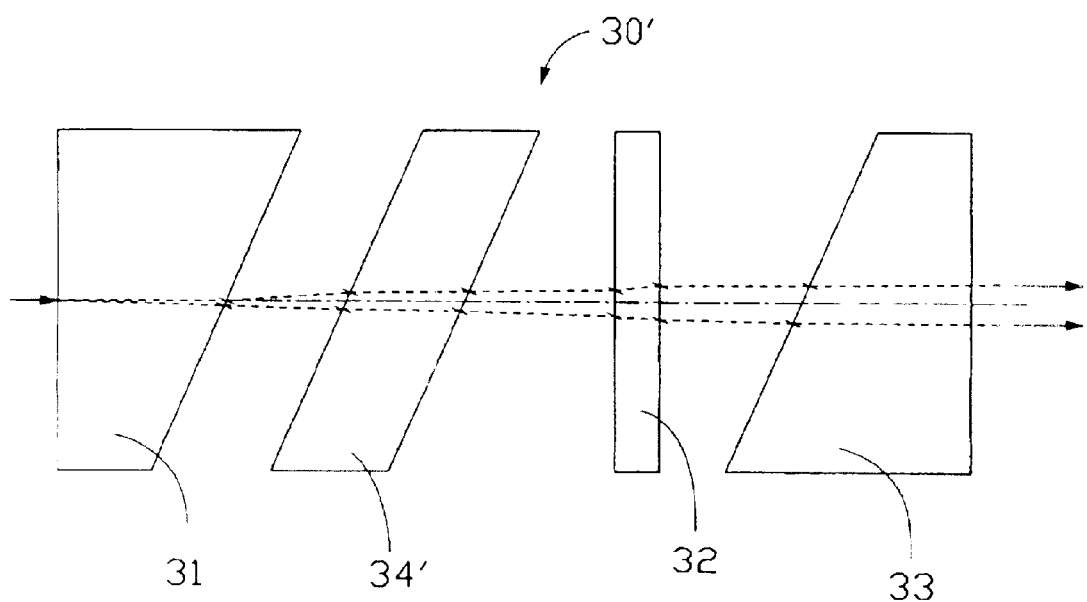
FIG. 6 is a schematic view of a light beam passing in a forward direction through an isolating unit in accordance with an alternative embodiment of the present invention.

FIG. 6 shows an optical isolating unit 30' in accordance with an alternative embodiment of the present invention. Most of a structure of the optical isolating unit 30' is identical to the structure of the optical isolating unit 30 of the preferred embodiment. However, the optical isolating unit 30' comprises a hexahedral beam displacer 34' instead of the pair of wedge-shaped beam displacers 34. The beam displacer 34' is disposed between the first birefringent wedge 31 and the optical rotator 32.

In a further alternative embodiment of the present invention, the optical rotator 32 is also shaped as a hexahedron. Such shaping creates an offset of a light beam that effectively eliminates any displacement of the light beam that might otherwise occur.

It should be understood, however, that even though numerous characteristics and advantages of embodiments of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An optical isolator comprising:
    a first optical collimator comprising:
        a first collimating lens,
        an input optical fiber terminating opposite one end of the first collimating lens, and
        a ferrule retaining the input fiber therein;
    a second optical collimator comprising:
        a second collimating lens,
        an output optical fiber terminating opposite one end of the second collimating lens, and
        a ferrule retaining the output fiber therein; and
    an optical isolating unit disposed between the first and second optical collimators, the optical isolating unit comprising:
        a first birefringent wedge and a second birefringent wedge,
        an optical rotator disposed between the first and second birefringent wedges,
        two beam displacers disposed at opposite ends of the optical rotator, and
        a magnetic tube enclosing the first birefringent wedge, the optical rotator and the second birefringent wedge sequentially therein.

2. The optical isolator as described in claim 1, wherein each of the beam displacers is generally a wedge-shaped crystal.

3. The optical isolator as described in claim 1, wherein the beam displacers are fixed to the opposite ends of the optical rotator with adhesive.

4. The optical isolator as described in claim 1, wherein an outmost end surface of each of the first and second birefringent wedges is attached to a corresponding inmost end surface of each of the first and second collimating lenses respectively.

5. The optical isolator as described in claim 1, wherein at least a portion of each of the first and second optical collimators is received in the magnetic tube.

6. An optical isolator comprising:
    a first optical collimator comprising:
        a first collimating lens,
        an input optical fiber terminating opposite one end of the first collimating lens, and
        a ferrule retaining the input fiber therein;
    a second optical collimator comprising:
        a second collimating lens,
        an output optical fiber terminating opposite one end of the second collimating lens, and
        a ferrule retaining the output fiber therein; and
    an optical isolating unit disposed between the first and second optical collimators, the optical isolating unit comprising:
        a first birefringent wedge and a second birefringent wedge,
        an optical rotator,
        a beam displacer, and
        a magnetic tube enclosing the first birefringent wedge, the optical rotator and the second birefringent wedge sequentially therein;

wherein
the optical rotator and the beam displacer are disposed between the first and second birefringent wedges.

7. The optical isolator as described in claim 6, wherein the beam displacer is a hexahedral crystal.

8. The optical isolator as described in claim 6, wherein an outmost end surface of each of the first and second birefringent wedges is attached to a corresponding inmost end surface of the first and second collimating lenses respectively.

9. The optical isolator as described in claim 6, wherein at least a portion of each of the first and second optical collimators is received in the magnetic tube.

10. An optical isolator comprising:

a first optical collimator with a first lens thereof;

a second optical collimator with a second lens thereof said second lens being opposite to said first lens with a space therebetween;

first and second birefringent wedges respectively attached to ends of the corresponding first and second lenses, respectively; and an optical rotator with first and second beam displacers, said beam displacers being disposed between said first and second lenses on opposite sides of the rotator; wherein
the first beam displacer faces the first lens with a first distance therebetween, and the second beam displacer faces the second lens with a second distance therebetween.

11. The isolator as described in claim 10, wherein a magnetic tube encloses the rotator and the associated first and second beam displacers, and said ends of the first and second lenses.

* * * * *